(12) United States Patent
Perkins, III et al.

(10) Patent No.: US 7,656,670 B2
(45) Date of Patent: Feb. 2, 2010

(54) ELECTRONIC BLAST WITH REMOTE CAPACITOR PLACEMENT

(75) Inventors: Seymour Perkins, III, Hinsdale, IL (US); Jeffrey Lord, Schaumburg, IL (US); Subramanian Muthu, Hoffman Estates, IL (US); Bernd Clauberg, Schaumburg, IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 132 days.

(21) Appl. No.: 11/718,551

(22) PCT Filed: Nov. 3, 2005

(86) PCT No.: PCT/IB2005/053593

§ 371 (c)(1),
(2), (4) Date: May 3, 2007

(87) PCT Pub. No.: WO2006/048835

PCT Pub. Date: May 11, 2006

(65) Prior Publication Data

US 2008/0012505 A1      Jan. 17, 2008

Related U.S. Application Data

(60) Provisional application No. 60/624,887, filed on Nov. 4, 2004.

(51) Int. Cl.
H05K 7/00 (2006.01)

(52) U.S. Cl. ............... 361/734; 361/763; 361/600; 361/15; 361/16

(58) Field of Classification Search .......... 361/15, 361/16, 17, 124, 117, 120, 271, 274.1, 274.3, 361/282, 310, 600, 621, 618, 713, 734, 765, 361/763, 821, 521, 517, 535, 534, 541, 301
See application file for complete search history.

(56) References Cited

U.S. PATENT DOCUMENTS

| | | | |
|---|---|---|---|
| 4,503,360 A | 3/1985 | Bedel | |
| 4,670,816 A * | 6/1987 | Johnk et al. | 361/323 |
| 5,016,139 A | 5/1991 | Stopa et al. | |
| 5,091,823 A * | 2/1992 | Kanbara et al. | 361/697 |
| 5,703,440 A | 12/1997 | Kachmarik et al. | |
| 5,818,705 A | 10/1998 | Faulk | |
| 5,905,647 A * | 5/1999 | Shirai | 363/141 |
| 6,066,921 A * | 5/2000 | Nakamura et al. | 315/71 |
| 6,078,145 A * | 6/2000 | Tillinghast et al. | 315/241 S |
| 6,107,744 A * | 8/2000 | Bavaro et al. | 315/86 |
| 6,700,328 B2 | 3/2004 | Toyama | |
| 6,795,283 B2 * | 9/2004 | Lisauskas et al. | 361/23 |
| 7,012,376 B2 * | 3/2006 | Yamashita et al. | 315/46 |
| 2003/0071573 A1 * | 4/2003 | Chien | 315/56 |
| 2003/0227263 A1 * | 12/2003 | Benensohn | 315/224 |

OTHER PUBLICATIONS

"Thermal Management Designs for Natural Convection Cooled Low Profile Adaptor" 12MM Slim Adaptor, Design Approach White Papaer, Rev:2.00 Mar. 12, 2003, "Abstract" on p. 1 + A General Description of the Requirements on p. 2 + p. 3, 5, 7, 8, 13.

* cited by examiner

Primary Examiner—Tuyet Vo

(57) ABSTRACT

An electronic ballast with remote capacitor placement includes a first housing (34); a second housing (36); an AC/DC converter (22); a DC bus (24) operably connected to the AC/DC converter (22); a lamp driver (26) operably connected to the DC bus (24); and a storage capacitor (32) connected to the DC bus (24) with capacitor wires (30). The AC/DC converter (22), the DC bus (24), and the lamp driver (26) are disposed in the first housing (34); the storage capacitor (32) is disposed in the second housing (36); and the first housing (34) is thermally isolated and physically separated from the second housing (36).

15 Claims, 2 Drawing Sheets

ELECTRONIC BLAST WITH REMOTE CAPACITOR PLACEMENT

CROSS REFERENCE TO RELATED APPLICATION

Figure 1:
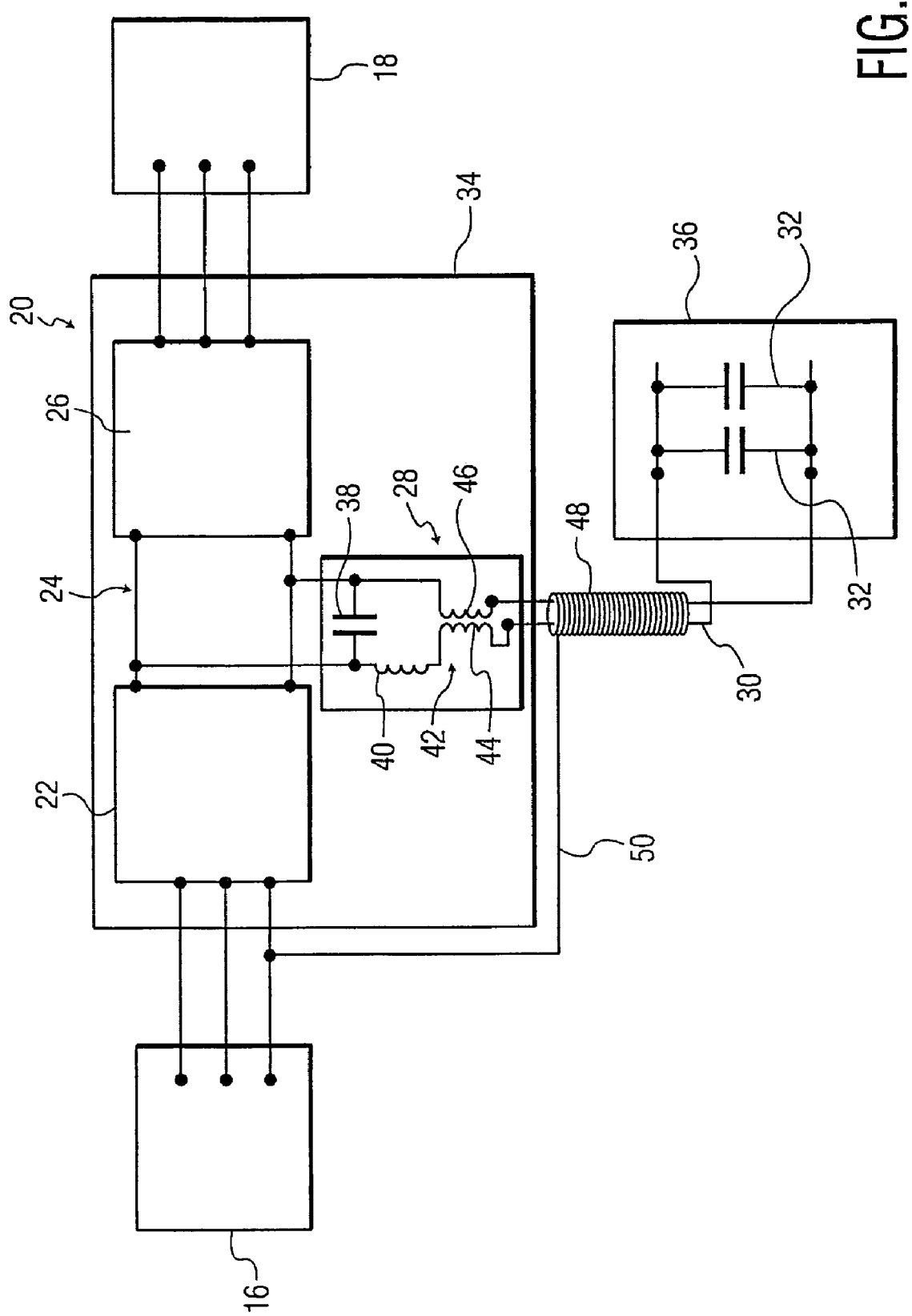

This application claims the benefit of U.S. provisional application Ser. No. 60/624,887, filed Nov. 4, 2004, the entire subject matter of which is hereby incorporated by reference.

This invention relates generally to electronic ballasts, and more specifically to electronic ballasts with remote capacitor placement.

Electronic ballasts for lighting applications typically use two energy conversion stages: an AC/DC converter to convert the AC mains voltage to DC voltage and a lamp driver to drive a lamp from the DC bus voltage. The DC bus includes capacitors as the energy storage element, which holds the DC bus voltage at a nearly constant value.

During operation, the electronic ballast generates heat from resistive losses in power semiconductors and other passive components. The heat generated increases the temperature inside the ballast housing over the ambient temperature, so that the components inside the ballast housing operate above the ambient temperature. In the present electronic ballasts, the storage capacitors are located inside the housing and operate at the higher housing temperature. Capacitor lifetime is reduced by the power of two with the increase in operating temperature above nominal operating temperature, so the higher operating temperature in the housing reduces capacitor lifetime. For example, if the capacitors operate at 10° C. above the nominal operating temperature, the capacitor lifetime is reduced by half, but if the capacitors operate at 10° C. below the nominal operating temperature, the capacitor lifetime doubles.

In lighting applications, electronic ballasts are mounted in lighting fixtures near the ceiling, where hot air accumulates. Thermal plumes generated by the lighting sources, such as HID and incandescent lamps, also increase the temperature at the lighting fixtures. Increased ambient temperature around the lighting fixture increases the internal operating temperature of the lighting fixture and ballast, subjecting the capacitors to high operating temperatures. Because the capacitor is a primary component of the electronic ballast, the high operating temperatures result in premature capacitor failure and early ballast replacement, wasting resources and incurring added maintenance.

It would be desirable to have an electronic ballast with remote capacitor placement that overcomes the above disadvantages.

One aspect of the present invention provides an electronic ballast including a first housing; a second housing; an AC/DC converter; a DC bus operably connected to the AC/DC converter; a lamp driver operably connected to the DC bus; and a storage capacitor connected to the DC bus with capacitor wires. The AC/DC converter, the DC bus, and the lamp driver are disposed in the first housing; the storage capacitor is disposed in the second housing; and the first housing is thermally isolated and physically separated from the second housing.

Another aspect of the present invention provides an electronic ballast system including first means for housing an AC/DC converter, a DC bus, and a lamp driver; second means for housing a storage capacitor; and means for electrically connecting the DC bus and the storage capacitor. The first housing means is thermally isolated and physically separated from the second housing means.

Another aspect of the present invention provides an electronic ballast including a first housing; a second housing; an AC/DC converter, the AC/DC converter being operably connected to a mains input; a DC bus operably connected to the AC/DC converter; a lamp driver operably connected to the DC bus, the lamp driver being operably connected to a lamp output; a filter operably connected across the DC bus; and a storage capacitor connected to the filter with capacitor wires. The AC/DC converter, the DC bus, the filter, and the lamp driver are disposed in the first housing; the storage capacitor is disposed in the second housing; and the first housing is thermally isolated and physically separated from the second housing.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

Figure 2:
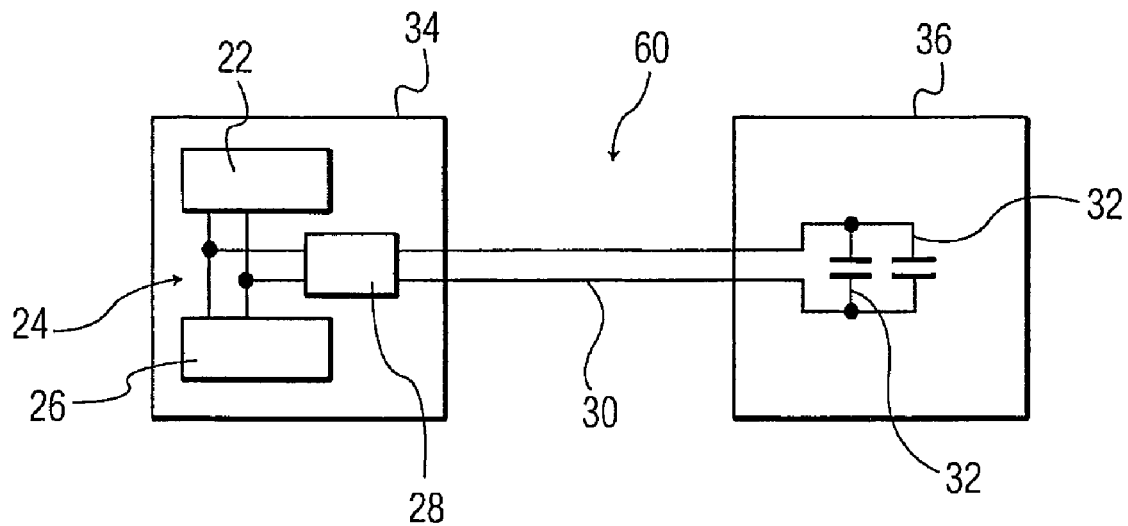
Figure 3:
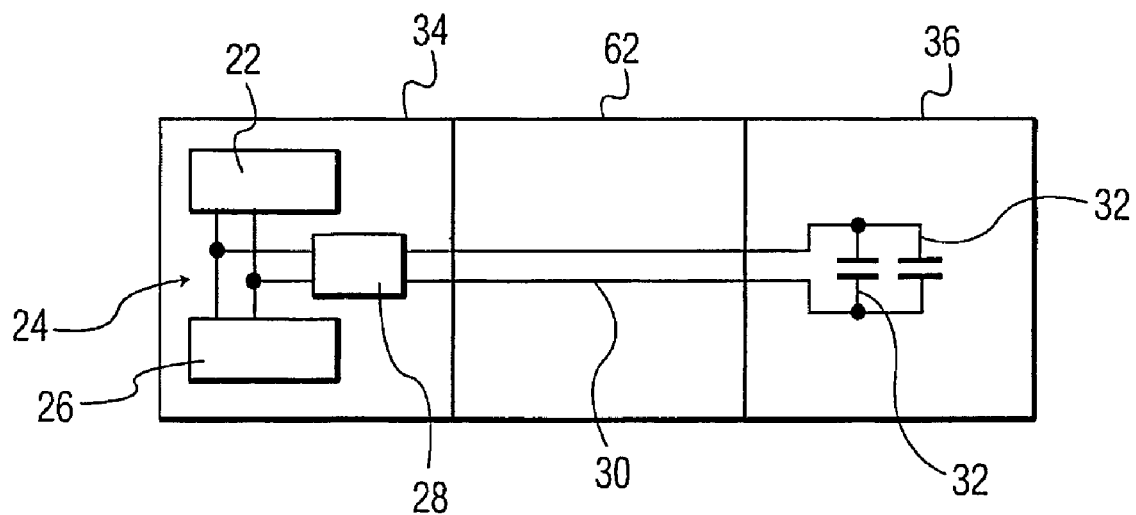

FIG. 1 is a schematic diagram of an electronic ballast with remote capacitor placement made in accordance with the present invention; and FIGS. 2 & 3 are schematic diagrams of physical arrangements of an electronic ballast with remote capacitor placement made in accordance with the present invention.

FIG. 1 is a schematic diagram of an electronic ballast with remote capacitor placement made in accordance with the present invention. Electronic ballast 20 receives mains power from mains input 16 and provides power for a lamp at lamp output 18. The electronic ballast 20 includes an AC/DC converter 22 operably connected to a lamp driver 26 through DC bus 24, a filter 28 connected across the DC bus 24, and capacitor wires 30 connecting storage capacitors 32 to the filter 28. The AC/DC converter 22, the DC bus 24, the lamp driver 26, and the filter 28 are disposed in a first housing 34. The storage capacitors 32 are disposed in a second housing 36 and can be one capacitor or can be a number of capacitors connected in parallel and/or in series. The first housing 34 and the second housing 36 are thermally isolated from each other. In one embodiment, the filter 28 is omitted and the capacitor wires 30 are connected directly to the DC bus 24. In an alternative embodiment, the filter 28 is located at the first housing 34 outside of the first housing 34.

The AC/DC converter 22, the DC bus 24, the lamp driver 26, and the storage capacitors 32 are conventional components as typically used in electronic ballasts. The AC/DC converter 22, the DC bus 24, and the lamp driver 26 are heat generating components of the electronic ballast 20, i.e., they include MOSFETs, diodes, resistors, magnetic components and the like which generate heat during electronic ballast operation. The storage capacitors 32 generate little heat, but have a lifetime affected by operating temperature. Placing the storage capacitors 32 in the second housing 36 thermally isolated from the heat generating components in the first housing 34 keeps the storage capacitors 32 at a lower temperature and increases capacitor operating lifetime.

The first housing 34 and the second housing 36 can be any housing suitable for holding the electronic ballast components, such as plastic or metal housings. The housing can include cooling features, such as ventilation slots and/or cooling fins. In one embodiment, the housing can use a portion of the lighting fixture for a cooling feature, as long as the first housing 34 and the second housing 36 are thermally isolated from each other. When the second housing 36 is metal, a grounding wire between the second housing 36 and ground can be used to ground the housing. In one embodiment, the second housing 36 is integral to the storage capacitors 32, such as a casing disposed about the storage capacitor or capacitors. In an alternative embodiment, the second housing 36 is omitted and the storage capacitors 32 are mounted without a housing.

The filter 28 can be any filter suitable for reducing or preventing high frequency current flow from the DC bus 24 onto the capacitor wires 30. In the example shown, the filter 28 includes a filter capacitor 38, a differential mode EMI coil 40, and a common mode EMI coil 42. The common mode EMI coil 42 includes a first EMI coil 44 and a second EMI coil 46, with the first EMI coil 44 and the second EMI coil 46 being magnetically coupled. The filter capacitor 38 is connected in parallel across the DC bus 24. The differential mode EMI coil 40 and the first EMI coil 44 are connected in series between one side of the DC bus 24 and a first conductor of the capacitor wires 30 connected to one side of the storage capacitors 32. The second EMI coil 46 is connected in series between the other side of the DC bus 24 and a second conductor of the capacitor wires 30 connected to the other side of the storage capacitors 32.

Switching of power semiconductors in the AC/DC converter 22 and the lamp driver 26 generates high frequency current at the switching frequency. The filter 28 reduces high frequency current flow from the DC bus 24 onto the capacitor wires 30 to avoid generation of electromagnetic interference (EMI) on the capacitor wires 30. The filter capacitor 38, such as a film capacitor, is sized to provide sufficient capacitance in the first housing 34 so that the high frequency current flows through the filter capacitor 38. The differential mode EMI coil 40 connected in series with the storage capacitors 32 also suppresses the high frequency current flowing through the storage capacitors 32. The differential mode EMI coil 40 and the common mode EMI coil 42 ensure that the electronic ballast 20 meets electromagnetic compliance (EMC) requirements. Those skilled in the art will appreciate that the filter requirements depend on the particular configuration of the electronic ballast desired and the shielding of the particular components. In one embodiment, the filter 28 is omitted and the capacitor wires 30 are connected directly to the DC bus 24.

In one embodiment, the capacitor wires 30 are a shielded conductor pair with a shield 48 electrically connected to the common of the mains input 16 with ground wire 50. In the example shown, the ground wire 50 passes outside of the first housing 34. In alternative embodiments, the ground wire 50 is located inside the first housing 34, or partially inside and partially outside of the first housing 34. In another alternative embodiment, the capacitor wires 30 are readily detachable from the filter 28 and/or the storage capacitors 32 so that the capacitor wires 30 can be supplied in prefabricated lengths or the storage capacitors 32 can be replaced independently of the components in the first housing 34.

FIGS. 2 & 3, in which like elements share like reference numbers with FIG. 1, are schematic diagrams of physical arrangements of an electronic ballast with remote capacitor placement made in accordance with the present invention. The first housing and second housing are thermally isolated and physically separated. Thermally isolated is defined herein as isolated so that heat generated by the heat generating components in the first housing does not increase the temperature of the storage capacitors in the second housing. Any heat from the heat generating components passing by conduction onto the capacitor wires dissipates before reaching the storage capacitors.

Referring to FIG. 2, the first housing 34 and the second housing 36 are physically separated and thermally isolated from each other by a space 60. The space 60 can be of any dimension desired. For example, the first housing 34 can be located at a ceiling lighting fixture in the center of a room and the second housing 36 can be located in a corner of the room. Components in addition to the capacitor wires 30 can be disposed in the space 60. For example, the first housing 34 can be located at a ceiling lighting fixture in the center of a room and the second housing 36 can be located above the ceiling, with the ceiling disposed in the space 60.

Referring to FIG. 3, the first housing 34 and the second housing 36 are physically separated and thermally isolated from each other by a third housing 62. Components in addition to the capacitor wires 30 can be disposed in the third housing 62. For example, the first housing 34 can be located on one end of a lighting fixture, the lamp and other lighting fixture components can be located in and/or attached to the third housing 62, and the second housing 36 can be located at the opposite end of the lighting fixture.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. An electronic ballast, comprising:
   a first housing;
   a second housing;
   an AC/DC converter;
   a DC bus operably connected to the AC/DC converter;
   a lamp driver operably connected to the DC bus;
   a storage capacitor operably connected to the DC bus with capacitor wires; and
   a filter electrically connected between the DC bus and the capacitor wires, the filter being disposed at the first housing,
   wherein the AC/DC converter, the DC bus, and the lamp driver are disposed in the first housing; the storage capacitor is disposed in the second housing; and the first housing is thermally isolated and physically separated from the second housing; and
   wherein the filter comprises:
   a filter capacitor;
   a differential mode EMI coil; and
   a common mode EMI coil, the common mode EMI coil having a first EMI coil magnetically coupled to a second EMI coil;
      wherein the filter capacitor is connected in parallel across the DC bus; the differential mode EMI coil and the first EMI coil are connected in series between a first side of the DC bus and a first conductor of the capacitor wires; and the second EMI coil is connected in series between a second side of the DC bus and a second conductor of the capacitor wires.

2. The electronic ballast of claim 1, wherein the storage capacitor comprises a plurality of capacitors.

3. The electronic ballast of claim 1, wherein the capacitor wires are a shielded conductor pair with a shield electrically connected to common.

4. The electronic ballast of claim 1, wherein the second housing is a grounded metal housing.

5. The electronic ballast of claim 1, wherein the the first housing and the second housing are spaced apart.

6. The electronic ballast of claim 1, further comprising a third housing disposed between the first housing and the second housing.

7. The electronic ballast of claim 1, wherein the first housing comprises metal or plastic.

8. The electronic ballast of claim 1, wherein the second housing comprises metal or plastic.

9. An electronic ballast, comprising:
a first housing;
a second housing;
an AC/DC converter, the AC/DC converter being operably connected to a mains input;
a DC bus operably connected to the AC/DC converter;
a lamp driver operably connected to the DC bus, the lamp driver being operably connected to a lamp output;
a filter operably connected across the DC bus; and
a storage capacitor operably connected to the filter with capacitor wires;
wherein the AC/DC converter, the DC bus, the filter, and the lamp driver are disposed in the first housing; the storage capacitor is disposed in the second housing; and the first housing is thermally isolated and physically separated from the second housing, and
wherein the filter comprises;
a filter capacitor;
a differential mode EMI coil; and
a common mode EMI coil, the common mode EMI coil having a first EMI coil magnetically coupled to a second EMI coil;
wherein the filter capacitor is connected in parallel across the DC bus; the differential mode EMI coil and the first EMI coil are connected in series between a first side of the DC bus and a first conductor of the capacitor wires; and the second EMI coil is connected in series between a second side of the DC bus and a second conductor of the capacitor wires.

10. The electronic ballast of claim 9, wherein the capacitor wires are a shielded conductor pair with a shield electrically connected to common.

11. The electronic ballast of claim 9, wherein the first housing and the second housing are spaced apart.

12. The electronic ballast of claim 9, further comprising a third housing disposed between the first housing and the second housing.

13. An electronic ballast comprising:
a first housing;
an AC/DC converter;
a DC bus operably connected to the AC/DC converter;
a lamp driver operably connected to the DC bus;
a storage capacitor operably connected to the DC bus with capacitor wires; and
a filter electrically connected between the DC bus and the capacitor wires, the filter being disposed at the first housing
wherein the AC/DC converter, the DC bus, and the lamp driver are disposed in the first housing; and the first housing is thermally isolated and physically separated from the storage capacitor; and
wherein the filter comprises:
a filter capacitor;
a differential mode EMI coil; and
a common mode EMI coil, the common mode EMI coil having a first EMI coil magnetically coupled to a second EMI coil;
wherein the filter capacitor is connected in parallel across the DC bus; the differential mode EMI coil and the first EMI coil are connected in series between a first side of the DC bus and a first conductor of the capacitor wires; and the second EMI coil is connected in series between a second side of the DC bus and a second conductor of the capacitor wires.

14. The electronic ballast of claim 13, wherein the storage capacitor comprises a plurality of capacitors.

15. The electronic ballast of claim 13, wherein the capacitor wires are a shielded conductor pair with a shield electrically connected to common.

\* \* \* \* \*